Sept. 24, 1963
A. BASSETT
3,104,768
TRANSFER APPARATUS
Filed March 16, 1962
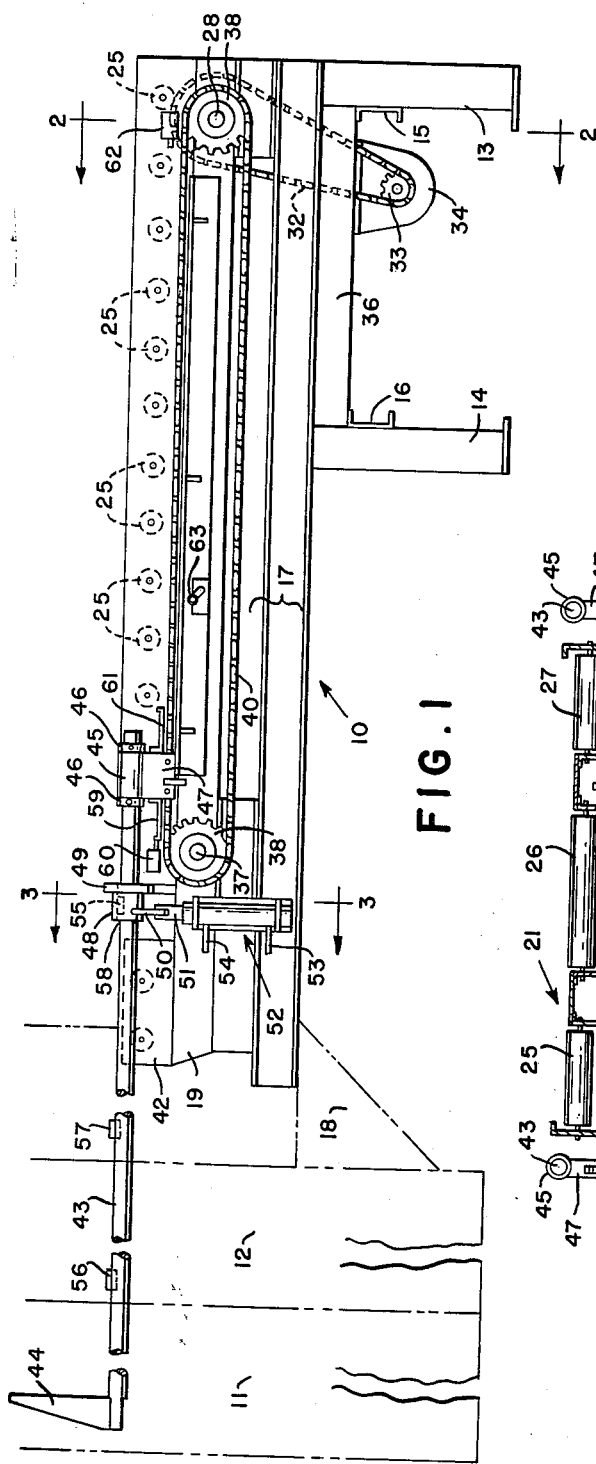
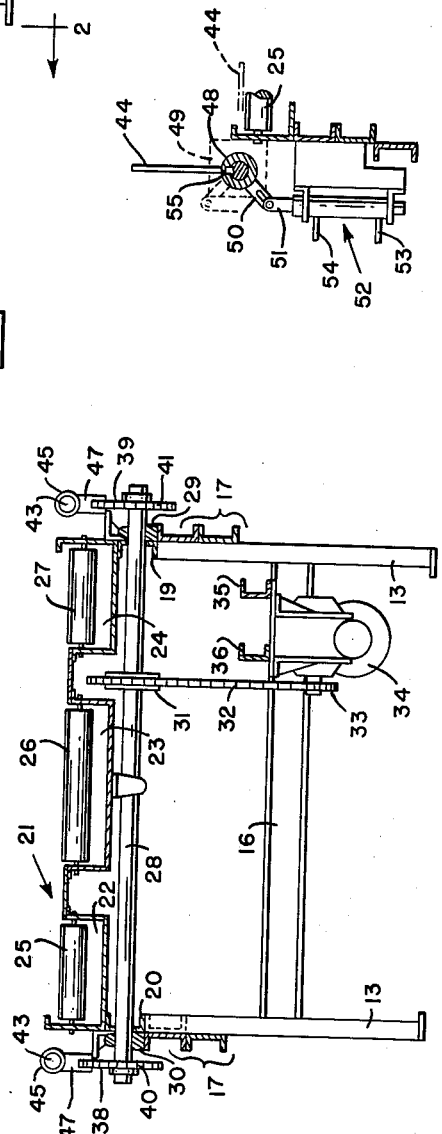
INVENTOR.
ALBERT BASSETT
BY
Robertson and Smythe
ATTORNEYS

3,104,768
TRANSFER APPARATUS
Albert Bassett, Oconomowoc, Wis., assignor to Basic Products Corporation, Watertown, Wis., a corporation of Wisconsin
Filed Mar. 16, 1962, Ser. No. 180,221
5 Claims. (Cl. 214—23)

The present invention relates to material handling apparatus, and particularly to a new and improved transfer mechanism for transferring work from a heat treating furnace to a quench elevator associated with a quench tank, and for transferring the work onto an unloading table after the quench cycle has taken place.

The principal object of the invention is to provide a transfer mechanism in which an oscillatable reciprocable work extractor is arranged in conjunction with equipment including an unloading table, a furnace and a quench elevator such that the extractor will not interfere with the movement of work during a cycle of operations involving said equipment.

Another object of the invention is to provide such a transfer mechanism that will effectively reach all work within the furnace.

Still another object of the invention is to provide such a transfer mechanism including a reciprocable work extractor that will have the capacity to be oscillated into and out of effective position at different points along its reciprocative path.

In one aspect of the invention, a work unloading table may include a plurality of closely spaced, transversely arranged, parallel rollers along which work may be easily moved. The table also may support along each side thereof an endless chain that extends throughout substantially the entire length of the table and passes over sprockets at each end thereof. The sprockets at one end of the table may be fixed to a shaft which is driven by a reversing motor also mounted on the table structure.

In another aspect of the invention, long extractor rods may be mounted in bearing ways for reciprocative as well as oscillatory motion on each side of the work unloading table. These rods may have an arm attached to one end thereof that extends at right angles thereto.

In still another aspect of the invention, each extractor rod may pass through a sleeve member having a keyway therein adapted to register with keys fixed to the extractor rod at predetermined spaced points therealong. The sleeve member may be journaled for oscillatory movement and may include a radial arm that is, in turn, connected to the piston rod of a fluid-operated piston and cylinder mechanism that is mounted on the side of the table structure.

In still another aspect of the invention, the end of each extractor rod opposite that supporting the radial arm may be journaled in a sleeve having a depending plate, and collars may be fixed to the extractor rod on each side of said sleeve, so that the rod may turn in the sleeve but the sleeve does not move axially of the rod. The depending plate may be attached to the upper flight of one of the endless chains, the construction of the parts being such that movement of the chain imparts a corresponding movement to the extractor rod to which it is connected.

In still another aspect of the invention, limit switches may be stationarily mounted on the table structure along the path of chain movement, and switch operators may be fixed to the depending plate that is connected to the chain for operating said switches to effect reversal of the chain movement and with it the extractor bars, as well as to control the operation of the bar oscillating cylinder and piston mechanism.

The above, other objects and novel features of the invention will become apparent from the following specification and accompanying drawing which is merely exemplary.

In the drawing:

FIG. 1 is a side elevational view of transfer apparatus to which the principles of the invention have been applied;

FIG. 2 is a sectional elevational view, taken substantially along line 2—2 of FIG. 1; and FIG. 3 is a sectional elevational view, taken substantially along line 3—3 of FIG. 1.

Referring to the drawing, the principles of the invention are shown as applied to a work unloading table 10 that may be arranged in line with a heat treating furnace 11 and a quenching tank 12. The table 10 may include legs 13 and 14 on each side thereof that are connected together by channel members 15 and 16. Other channel members 17 on each side of the table 10 may extend transversely of the channel members 15 and 16 a substantial distance from legs 13 and 14, and may be supported at their ends remote from legs 13 and 14 by a bracket 18 fixed to the quenching tank 12 or by any other suitable means.

Other channel members 19 and 20 may be mounted on top of the legs 13, 14 and may extend parallel to the channel members 17. A table top 21 may be supported on top of the channel members 19 and 20 and it may include a plurality of parallel channels 22, 23 and 24 in which may be journaled parallel idle rolls 25, 26 and 27 at closely spaced intervals throughout the length of the channels 22, 23 and 24. The rolls 25, 26 and 27 form a support for the work as it is withdrawn from the quenching rack within the quenching tank 12.

A shaft 28 at one end of table 10 may extend transversely through channel members 19, 20 and may be journaled in bearings 29, 30 mounted on top of the channel members 17. A sprocket 31, fixed to shaft 28, may be connected through a chain 32 to another sprocket 33 fixed to the output shaft of a reversing motor 34 that may be mounted on cross members 35 and 36 on channel members 15 and 16. Another shaft 37 may be similarly mounted at the opposite end of table 10 from that supporting shaft 28. Sprockets 38 and 39 may be fixed to the ends of shafts 28 and 37 on each side of table 10, and endless chains 40 and 41 may respectively connect the two sprockets 38 and the two sprockets 39.

On each side of the table 10 near the end that supports the shaft 37, a bearing guide 42 may be mounted on top of the channel members 19 and 20. Extracting rods 43 of identical design are mounted in said guides 42 for reciprocative as well as oscillatory movement. One end of each of the rods 43 may include an arm 44 fixed to, and extending at right angles to the rods 43. The opposite end of each rod 43 may have a sleeve member 45 journaled thereon between two collars 46 that are pinned to shaft 43. The sleeve member 45 may include a depending plate means 47 that may be attached by pintle pins to the top reach of the corresponding chain 40 or 41. From the foregoing it is evident that rotation of the motor 34 in opposite directions will move the top reach of chains 40 and 41 forwardly and backwardly, thereby imparting a like motion to bars 43 and arms 44.

Referring to FIGS. 1 and 3, each rod 43 may slidingly pass through a sleeve member 48 that may be mounted in a stationary bracket 49 for oscillatable motion. The sleeve member 48 may be provided with a radial arm 50 that is pivotally connected to a piston rod 51 of a piston and cylinder device 52. Lines 53 and 54 may supply pressure fluid to each side of a piston within cylinder device 52. The sleeve member 48 may include a keyway 55 extending axially therethrough that is adapted to register with keys 56, 57 and 58 on shaft 43 as the latter is reciprocated by the reverse rotation of motor 34.

With the apparatus in the condition shown in the drawing, the arm 44 is in a vertical plane at the forward end of the furnace 11, the key 58 is in register with the keyway 55 in sleeve member 48, and an arm 59 on plate 47 is in contact with a limit switch 60 mounted on the table 10. Operating switch 60 may cause a solenoid valve (not shown) to admit pressure fluid to line 53 and to exhaust line 54. Accordingly, the piston rod 51 and arm 50 will move to their dotted line positions (FIG. 3), turning arm 44 ninety degrees to its dotted line position in a horizontal plane. At the same time, operation of switch 60 may cause reversal of motor 34, thereby driving the top reach of chains 40 and 41 rightwardly (FIG. 1) and moving bars 43 rightwardly as well as any work that is engaged by arm 44 in its horizontal position. This rightward motion continues until an arm 61 on plate 47 operates a switch 62 at the opposite end of table 10 where the key 56 will be in register with keyway 55. Operation of switch 62 may admit pressure fluid to line 54 and exhaust line 53, causing arm 44 to be raised to its vertical solid line position. At the same time, motor 34 may be reversed, causing the top reach of chains 40, 41 to move leftwardly as well as the rods 43 and arms 44, while retaining the latter in their vertical positions so as to position said arms 44 behind work in furnace 11, whereupon the cycle of operations is repeated.

Other keys such as key 57 and other limit switches such as switch 63 may be provided for varying the effective reciprocative stroke of the rods 43.

Although the various features of the transfer device have been shown and described in detail to fully disclose one embodiment of the invention, it will be evident that changes may be made in such details and certain features may be used without others without departing from the principles of the invention.

What is claimed is:

1. In transfer apparatus for use with in-line heat treating equipment, table structure; endless chain means extending along each side of said table structure; reversing power means mounted on said table structure and drivingly connected to said endless chain means; bar means located in bearing ways on each side of said table and in parallel relation to said chain means; means for connecting said bar means to said chain means; work engaging means extending radially from said bar means; an axially fixed but turnable sleeve means through which said bar means reciprocally moves and having a keyway extending axially therethrough; spaced keys on said bar means adapted to register with said keyway at predetermined positions of said bar means along its reciprocative path; and means for turnably oscillating said sleeve means when said keys are in register with said keyway.

2. In transfer apparatus for use with in-line heat treating equipment, table structure; endless chain means extending along each side of said table structure; reversing power means mounted on said table structure and drivingly connected to said endless chain means; bar means located in bearing ways on each side of said table and in parallel relation to said chain means; means for connecting said bar means to said chain means; work engaging means extending radially from said bar means; an axially fixed but turnable sleeve means through which said bar means reciprocally moves and having a keyway extending axially therethrough; spaced keys on said bar means adapted to register with said keyway at predetermined positions of said bar means along its reciprocative path; and fluid operated means associated with said sleeve means for turnably oscillating said bar means and said work engaging means between vertical and horizontal planes.

3. In transfer apparatus for use with in-line heat treating equipment, table structure; endless chain means extending along each side of said table structure; reversing power means mounted on said table structure and drivingly connected to said endless chain means; bar means located in bearing ways on each side of said table and in parallel relation to said chain means; means for connecting said bar means to said chain means; work engaging means extending radially from said bar means; an axially fixed but turnable sleeve means through which said bar means reciprocally moves and having a keyway extending axially therethrough; spaced keys on said bar means adapted to register with said keyway at predetermined positions of said bar means along its reciprocative path; fluid-operated means associated with said sleeve means for turnably oscillating said bar means and said work engaging means between vertical and horizontal planes; and limiting means on said table structure for controlling the operation of said reversing power means.

4. In transfer apparatus for use with in-line heat treating equipment, table structure; endless chain means extending along each side of said table structure; reversing power means mounted on said table structure and drivingly connected to said endless chain means; bar means located in bearing ways on each side of said table and in parallel relation to said chain means; means for connecting said bar means to said chain means; work engaging means extending radially from said bar means; an axially fixed but turnable sleeve means through which said bar means reciprocally moves and having a keyway extending axially therethrough; spaced keys on said bar means adapted to register with said keyway at predetermined positions of said bar means along its reciprocative path; a radial arm connected to said turnable sleeve means; and a piston and cylinder device connected to said radial arm.

5. In transfer apparatus for use with in-line heat treating equipment, table structure; endless chain means extending along each side of said table structure; reversing power means mounted on said table structure and drivingly connected to said endless chain means; bar means located in bearing ways on each side of said table and in parallel relation to said chain means; means for connecting said bar means to said chain means; work engaging means extending radially from said bar means; an axially fixed but turnable sleeve means through which said bar means reciprocally moves and having a keyway extending axially therethrough; spaced keys on said bar means adapted to register with said keyway at predetermined positions of said bar means along its reciprocative path; a radial arm connected to said turnable sleeve means; a piston and cylinder device connected to said radial arm; and limiting means on said table structure for controlling the operation of said reversing power means.

References Cited in the file of this patent
UNITED STATES PATENTS

| | | |
|---|---|---|
| 2,108,355 | Swift | Feb. 15, 1938 |
| 2,681,136 | Ipsen | June 15, 1954 |
| 2,808,746 | Blomquist | Oct. 8, 1957 |